United States Patent
Cuadra et al.

(10) Patent No.: US 6,301,133 B1
(45) Date of Patent: Oct. 9, 2001

(54) POWER SUPPLY SYSTEM WITH ORING ELEMENT AND CONTROL CIRCUIT

(75) Inventors: Jason E. Cuadra; Krishnamurthi Mohan; Kevin D. Wildash; Mohamed Amin S. Bernat, all of Pasig (PH)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 09/287,865

(22) Filed: Apr. 7, 1999

(51) Int. Cl.$^7$ .................................................. H02M 7/537
(52) U.S. Cl. .................................................. 363/65
(58) Field of Search .................... 363/65, 69, 71; 307/53, 58, 69, 71, 82, 85–87

(56) References Cited

U.S. PATENT DOCUMENTS

| | | | |
|---|---|---|---|
| 4,924,170 | * 5/1990 | Henze | 323/272 |
| 5,493,154 | 2/1996 | Smith et al. . | |
| 5,610,452 | * 3/1997 | Shinner et al. | 307/89 |
| 5,612,581 | * 3/1997 | Kageyama | 307/64 |
| 5,726,845 | 3/1998 | Ho . | |
| 5,737,202 | * 4/1998 | Shimamori | 363/65 |
| 5,745,355 | * 4/1998 | Tracy et al. | 363/71 |

* cited by examiner

*Primary Examiner*—Matthew Nguyen
(74) *Attorney, Agent, or Firm*—Coudert Brothers

(57) ABSTRACT

In a redundant power supply system, N+1 power supply modules are operated in parallel to provide power to a single load which may be connected via a DC bus and may employ a remote voltage sensing circuit. Each power supply module includes an ORing element that isolates a corresponding AC power supply from delivering power to the load in various conditions representing a fault occurring in the system. Each ORing element and power supply module is coupled to a control circuit that drives the operations of the ORing element. The control circuit includes three comparators and associated circuitry each for detecting one of the following conditions of system failure representing by: the presence of reverse current flowing across the ORing element caused by short circuit in the system, a selective overvoltage condition caused by a power supply delivering too much voltage to the load; and a failure in an AC power supply giving rise to an undervoltage condition. An error amplification circuit is responsive to a slow rise starting voltage and prevents overshoot voltages from occurring at the load. A voltage feedback circuit is coupled to the error amplification circuit to prevent false undervoltage conditions and possible overvoltage conditions where a particular power supply module is initialized while other modules are in operation. A warning circuit detects undervoltage and overvoltage conditions in the power supply. The system includes a circuit for overtemperature protection when the ORing element overheats.

36 Claims, 5 Drawing Sheets

POWER SUPPLY SYSTEM WITH ORING ELEMENT AND CONTROL CIRCUIT

BACKGROUND OF THE INVENTION

1. Field of the Invention

The present invention relates to power supply systems, and more specifically to a plurality of power supply modules connected in parallel to a load and having associated ORing elements operable to selectively couple and decouple the outputs of each module to the load. The ORing elements may be controlled to isolate a faulty power supply module from the load under various conditions of system failure or sub-optimal performance.

2. Description of the Prior Art

There are a variety of conventional electrical power supply modules which include power converters that convert electrical power from one form into another. An example of this involves the conversion of AC power into DC voltage. The efficient performance of such power supply modules depends upon many factors, including the operation of the primary AC power source, the forward converter circuit, the auxiliary secondary voltage source, and the element used to couple the converted power to the load. A failure arising in any of these elements can lead to problems affecting the performance of the module and the power supply system of which the module is a part.

In conventional power supply systems, it is known to use a Schottky diode placed in series with the output of a power converter to isolate the output node of a faulty power supply from the load. This element is conventionally termed an "ORing" diode, (e.g., combining). The Schottky diode functions primarily as a switch, decoupling the output of a power supply (e.g., power converter) module from the load when a power failure occurs. One purpose for this arrangement is to prevent an interruption of the power to the load in the event of a failure or improper operation of a power supply module. For example, a DC bus typically connects all power supplies to each other and to the load, with the bus being highly susceptible to having DC bus voltage pulled down by such a failure. In most cases, the load is critically dependent on having a continuous source of well regulated DC voltage from the DC bus for its correct operation.

Although the technique of using a Schottky diode provides good system reliability, this approach has the disadvantage that the diode will dissipate an appreciable amount of power. This in turn reduces the efficiency of the power supply system. Accordingly, it would be desirable to reduce the amount of power dissipation by replacing the diode with an ORing element that has a lower voltage drop. Such an ORing element would need to be capable of simulating the characteristics and operation of a diode, while providing acceptable system reliability.

As the present inventors have realized, in order to improve system reliability, it is desirable that the ORing element be capable of isolating the power supply module from the load not only when the AC power supply fails, but also when a short circuit occurs in the power converter. It is also desirable that the ORing element be controllable to decouple the power supply module from the load when the power supply module delivers excessive voltage to the load.

Furthermore, it is also desirable for the ORing element to prevent spikes, dips or other anomalies in the voltage appearing at the load when the ORing element couples and decouples the power supply module with and from the load.

Still furthermore, it is desirable to have selective control of the ORing element to assist in detecting the failure of a power supply module, and to take into consideration situations contributing to false indications of failure of the power supply. The ORing element should also be controllable to prevent voltage dips or variations on the DC bus caused if a capacitor or rectifier circuit which is part of the power supply module should incur a short circuit. Moreover, the element should be reliable during step load changes, hot swapping and system power up conditions.

In a redundant power supply system, the power supply modules are commonly connected in parallel to provide increased power to a single load. Thus, it would be desirable to incorporate the features mentioned above in a parallel redundant power system to protect components connected at the load when failure conditions arise and are not properly responded to by a particular ORing element. These failure conditions can affect the voltage delivered to the load by the remaining functioning power supply modules. Therefore, it would be desirable to have a method of controlling the ORing element(s) to cause them to react to a variety of power failure conditions in a parallel mode or in a stand-alone mode, both of which will be defined in detail subsequently.

As the present inventors have realized, situations that should be addressed by such controllable ORing elements include undervoltage protection ("UVP") and overvoltage protection ("OVP"). These are defined to be the limits within which the ORing element and components of the system will properly operate and will be described in more detail subsequently. Such operation will ensure that only a faulty power supply module or modules would be isolated from the load, where for example, a number of power supply modules are operating to provide voltage to a DC bus connected to the load.

SUMMARY OF THE INVENTION

The present invention is directed to an architecture for a redundant power supply system which includes a number (N+1) of power supply modules having outputs connected in parallel to a single load via a common bus. Each of a plurality of power supply modules or converters has an associated ORing element, disposed between the output node of each module or converter and the load. The ORing elements are operable to selectively couple or decouple the power supply modules from the load, thereby effectively isolating current generated at a corresponding module from passing to the common bus. The ORing elements are controlled to decouple associated power supply modules from the load upon detection of one or more of a plurality of operating conditions, each representing a failure occurring, or sub-optimal performance occurring in the system. The architecture of the system provides for a control circuit associated with each ORing element to control the operation of the ORing element upon detection of one or more of these conditions.

An object of the present invention is to replace the Schottky diode with an ORing element that has a lower power dissipation. In a preferred embodiment, the ORing element is selected to be a low power dissipating switch, specifically a MOSFET device, which has a much lower voltage drop than the conventionally used Schottky diode.

Another object of the present invention is to provide an ORing element having a control node to enable operation thereof. A control circuit generates a control signal to be provided to the control node. The control signal effectively drives the operations of the ORing element for isolating the power supply module from the load when conditions representing a failure in a power supply module are detected.

Additionally, the control circuit includes an inventive arrangement that allows the ORing element to not only behave in a similar manner to the diode, but with improved system reliability and detection of conditions of system failure. The control circuit may be used in conjunction with any ORing element capable of being controlled.

When used in a redundant power supply system, the present invention accommodates high power levels by providing a simple, low cost solution that uses relatively few components. With the control circuit of the present invention used with each power supply module, the ORing element may be controlled to automatically isolate the power supply module when the output voltage from the converter starts to drop below the level of the DC bus voltage appearing at the load. Furthermore, the control circuit operates to prevent glitches on the DC bus when the ORing element changes state. Within the power supply module, where a converter circuit may include an output rectifier diode or an output electrolytic capacitor, the control circuit of the present invention precludes associated glitches from appearing on the DC bus in the event of a short circuit of these components. Also, the control circuit allows for the detection of failure in the converter circuit, while also recognizing when false failure indications arise.

Moreover, with the present invention, the control circuit provides DC overvoltage protection in which only the faulty power converter is shut down. The architecture ensures that all functions are reliable under all load conditions including step load changes. Of particular importance, the control circuit permits all functions to be reliable when starting up in a stand-alone mode or in a parallel mode.

In a preferred embodiment of the invention, the power supply system includes a common bus to which the load may be connected, and a plurality of power supply modules each producing an output to the common bus and thereby to the load. Each power supply module has an associated ORing element which is operable to selectively couple or decouple that module's output to or from the bus and therefore from the load upon detection of one of a desired set of conditions. Thus, each ORing element is capable of isolating current generated at the corresponding module from passing to the common bus when one or more of a plurality of conditions representing system failure occur. The preferred embodiment includes a plurality of control circuits each for controlling a corresponding ORing element, wherein each control circuit produces a control signal that operates the ORing element to cause the selective coupling and decoupling when one or more of these conditions occur.

In a preferred embodiment, each control circuit includes elements capable of detecting a plurality of conditions indicating a failure in a redundant power supply system, including: detecting when a rectified voltage falls lower than an undervoltage value; detecting when a short circuit is present in the power supply module; and detecting when a bus voltage exceeds an overvoltage value. Furthermore, each control circuit also includes: an error amplifier for preventing a false undervoltage or overvoltage condition arising at any time, including when the power supply module is initially turned on; and a voltage monitoring circuit when the system supplies a voltage that is beyond a predetermined range. Detectors each generate a control signal that is applied to the ORing element for selective coupling and decoupling of the output of a power supply module from the load.

Along with the apparatus defined herein, the present invention is also directed to a corresponding method of operating a redundant power supply system.

These and other objects of the present invention will become apparent to those skilled in the art from the following detailed description of the invention and preferred embodiments, the accompanying drawings, and the appended claims.

DESCRIPTION OF THE PREFERRED EMBODIMENT

Figure 1:
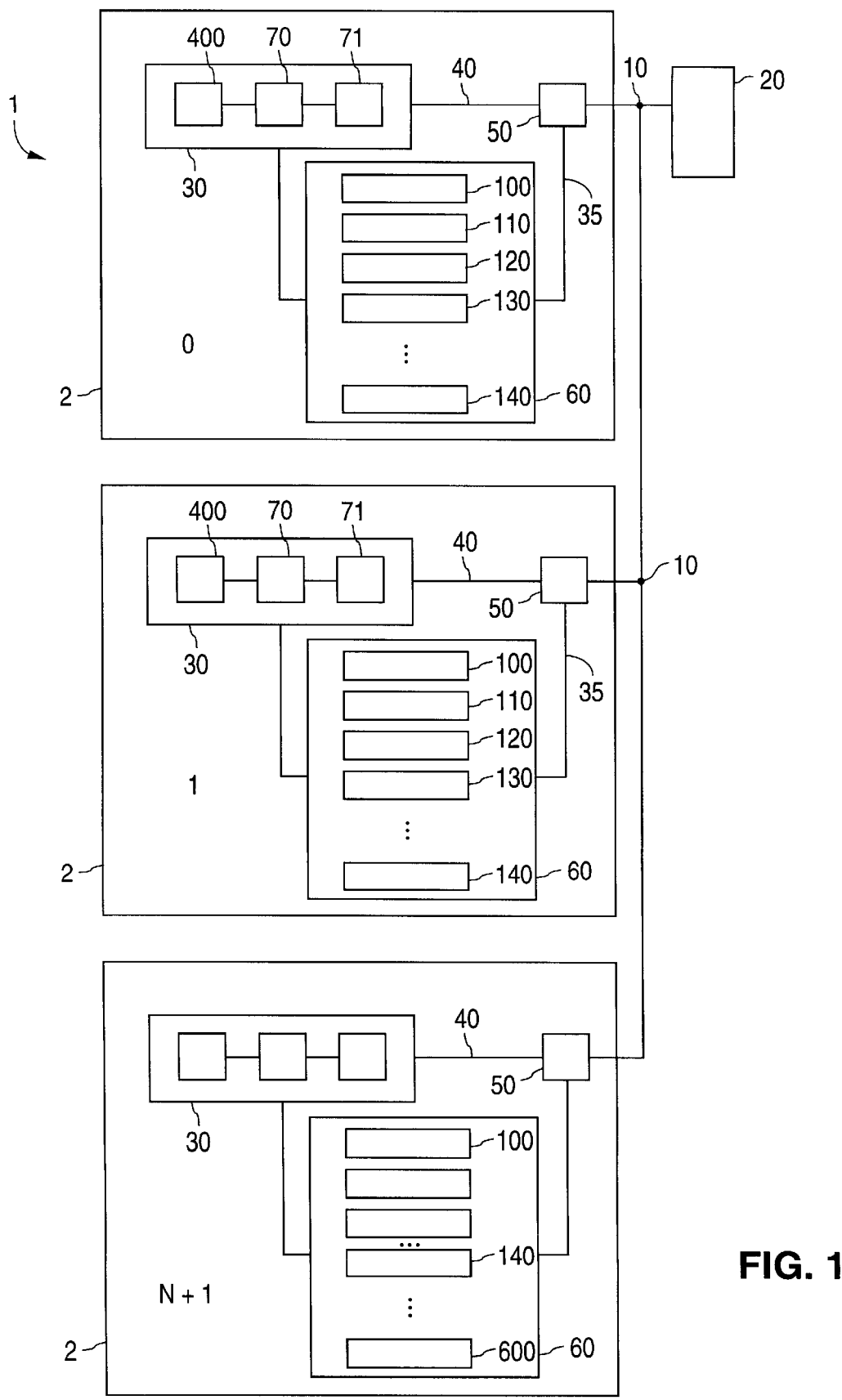
FIG. 1 is a block diagram of a parallel redundant power supply system according to a preferred embodiment of the present invention.

The present invention is directed to a power system architecture wherein two or more electrical power supply modules are coupled in parallel to provide output power to a single load. An exemplary power supply system, comprising 0 through N+1 power supply modules (each of which may comprise a primary source of AC power, a rectifier, and an electrical power converter), ORing elements and control circuits coupled to a single output load is shown in FIG. 1.

Power supply system 1 includes a plurality of redundant power supply modules 2. Each module 2 is connected to a common bus 10. The common bus 10 is connected to a load 20. Power supply module 2 includes a power converter module 30 having an output node 40. Each power converter module 30 is associated with a respective ORing element 50 for selectively coupling and decoupling the output node 40 of the converter module to or from the bus 10. The ORing element is used to isolate current generated in the converter module from passing to or form the common bus 10 and ultimately to the load 20 upon detection of one or more indications of malfunction in the power supply module 2. When not isolating the power converter module, the ORing element allows the power output generated by the converter module to reach the bus and the load.

Figure 2:
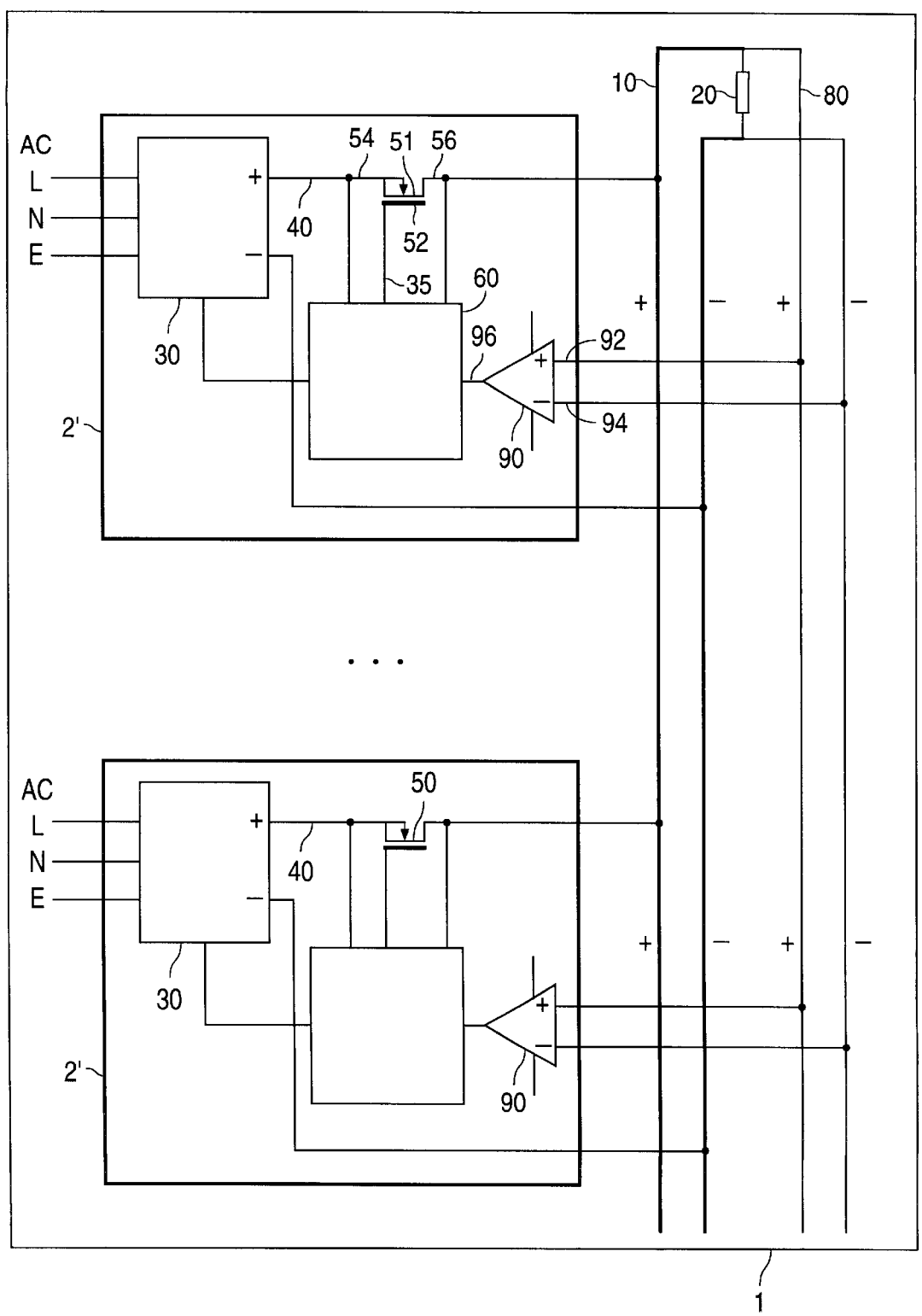
FIG. 2 is a combined block and schematic diagram of another embodiment of a parallel redundant power supply system according to the present invention.

Both the structure and function of the ORing element 50 of the present invention is distinguishable over ORing elements of the prior art. With the present invention, the ORing element 50 includes at least a control node and is operable to permit current flow between two points when a control signal is applied on line 35 to the control node. In FIG. 1, the two points are respectively the output node 40 and the bus 10, and the ORing element is operable to selectively couple and decouple the output node 40 from the bus. FIG. 2 shows two power supply modules 2' connected in a parallel redundant power supply system 1 and having outputs that are connected to a load 10. Two power supply modules 2' are shown for simplicity but it will be recognized by those skilled in the art that more modules may be connected in a similar manner. As shown schematically in FIG. 2, a preferred embodiment of the ORing element 50 is a low power dissipating controllable switch, e.g., a MOSFET device 51, connected in series between the output node 40 and the common bus 10. The MOSFET device 51 includes a control node 52 and operates to permit current flow between nodes 54 and 56. In practice, node 52 corresponds to the gate, node 54 corresponds to the source and node 56 corresponds to the drain of MOSFET device 51. It will be appreciated that other equivalent embodiments for ORing element 50 may be substituted so long as it is controllable as described herein. Accordingly, ORing element 50 may comprise a switching device, or a device that is able to change state so as to allow the selective coupling and decoupling operations described herein.

Referring back to FIG. 1, a control circuit 60 is depicted and used to control the corresponding ORing element 50. Control circuit 60 has a number of functions and requirements. The primary function of control circuit 60 is to generate a control signal to be applied to the ORing element 50, and in particular to the control node 52 of the MOSFET device 51. Additionally, the control circuit is adapted to prevent voltage spikes and dips from occurring at the common bus during the selective coupling and decoupling. Furthermore, the control circuit is adapted to provide predetermined timing constraints used in the selective coupling and decoupling operations. The manner in which control circuit 60 generates the control signal to be applied to the ORing element is based upon different sensing and detection functions pertaining to certain conditions of power supply system failure.

These sensing functions are illustrated generally in FIG. 1, where control circuit 60 may include, for example, a first detector 100 for detecting when a rectified voltage from the power converter module falls below an undervoltage value, a second detector 110 for detecting when a short circuit is present in a power supply module 2, a third detector 120 for detecting when the bus voltage exceeds an overvoltage value, a voltage monitoring circuit 130 for detecting or monitoring when the power supply module supplies a load voltage beyond a predetermined range, and an error amplifier 140 for providing feedback across the ORing element and for preventing a false undervoltage or overvoltage condition arising at any time. These sensing functions are typical of the operational features of control circuit 60 as seen in the block diagram of FIG. 1, and will be described in detail subsequently, both structurally and functionally. It will be appreciated by one of ordinary skill in the art that a subset of the above detection functions or additional detection functions 600 may also be included within control circuit 60 for generating the control signal to operate the ORing element(s), for example, detection functions designed to take into account additional constraints such as those imposed by manufacturing tolerances of components and temperature factors. Also for example, the additional detection functions represented by 600 may include a pulse detector for detecting the failure of a power supply to deliver any output current at all.

Also shown in FIG. 1 is a high-level block diagram of the interior function of power conversion module 30 pertaining to the generation of a power signal at output node 40. In the preferred embodiment, power is generated in module 30 via a source of AC power 400 which is coupled to a rectifier 70 and to a converter circuit 71. An AC signal is rectified by rectifier 70 and passed through a conventional power converter 71 so that the resulting signal from power module 30 represents a rectified voltage or current at output 40. As shown in FIG. 2, the control circuit 60 is coupled to receive pulses from the module 30 which may include a converter circuit. It may be appreciated that the present invention will operate with power supply modules having various types of conventional power converters. An example of this might be a conventional switch mode power converter having its output regulated by a conventional pulse width modulator or rectifying circuit. A boost converter, flyback converter, forward converter or other type of converter may be utilized as part of the inventive power system. One example of a forward converter includes single ended, push-pull, half-bridge and full-bridge variations. It will further be recognized by those skilled in the art that it is not necessary for the present invention to operate with a source of AC power that is generated within each of modules 0 through N+1, although such an arrangement provides redundancy in a power supply system. Each power supply module 2' may receive power from a single source, as illustrated by the embodiment shown in FIG. 2, where lead lines L, N and E extend beyond power supply module 2' to a single source of AC power (not shown). An alternative would be to use battery power to power the converter circuit in each power supply module.

In FIG. 1, DC bus 10 is connected to a load 20 represented as a resistor. For a more accurate voltage reading across load 20, and to eliminate the effects of the voltage drop between each power converter module 30 and the load 20, the voltage across load 20 is fed back to each power converter module 30 via a remote sense bus 80 and a remote voltage sensing circuit. The remote sensing circuit preferably takes the form of separate op-amps 90 functioning as differential amplifiers whose respective outputs are fed back to the control circuit 60 and then to each module 30. In some instances, the op-amp already exists in a power supply designed for redundant application. Each power supply module 2' is therefore able to respond to the exact voltage seen at the load 20. Inputs 92 and 94 of each op-amp are connected directly to the load 20 of the power supply system so that output 96 of each op-amp 90 is an accurate representation of the load voltage. The remote sense output is compared with a reference voltage so that the load voltage is regulated in each power supply module 2 independent of the voltage drop appearing in the cabling between each power converter module 30 and the load 20. When the voltage on the remote sense lines rises above a certain voltage level (as will be described in detail subsequently in the context of selective OVP), this indicates that one of the power supplies is delivering too much voltage. It will be appreciated that the remote sense circuit may comprise a variety of embodiments and will be further explained below in connection with FIGS. 3 and 5.

A general description of the functional blocks of the power supply system 1 according to the present invention has been given. The detailed circuits and operation of a preferred embodiment of the present invention will be described below. Although mention is made of specific numerical voltage levels, timing criteria and resistor values, it will be appreciated by one of ordinary skill in the art that these numerical values are illustrative of the preferred embodiment and will vary for other bus voltages and components used.

In describing the present invention, reference will be made to the following terms and acronyms and their corresponding meaning:

"stand alone mode" applies in the context of a redundant power supply system and refers to a particular power supply module in comparison with the remaining modules not in operation but powered off;

"parallel mode" applies in the context of a redundant power supply system and refers to a particular power supply module in comparison with the remaining modules already in operation and delivering power to the load;

"turned on" refers to being powered on or functioning in an operating state, or conducting because current is flowing therethrough;

"turned off" refers to being powered off or not in operation, or not conducting because current is not flowing therethrough;

"warm plug" refers to a particular power supply module being initialized from an off state when the load is connected to a common bus having a voltage level;

"UVP" refers to undervoltage protection, which is a predetermined minimum voltage level at which the ORing element will operate;

"OVP" refers to overvoltage protection, which is a predetermined maximum voltage level at which the ORing element will operate;

"POK" refers to power OK, that is, DC output voltage(s) are within the predetermined range set by the OVP and UVP;

"PSON" refers to the power supply being turned on; and,

"BOK" refers to bulk voltage OK, that is high voltage DC which feeds the output DC-to-DC converters is above its minimum allowed value.

Figure 3:
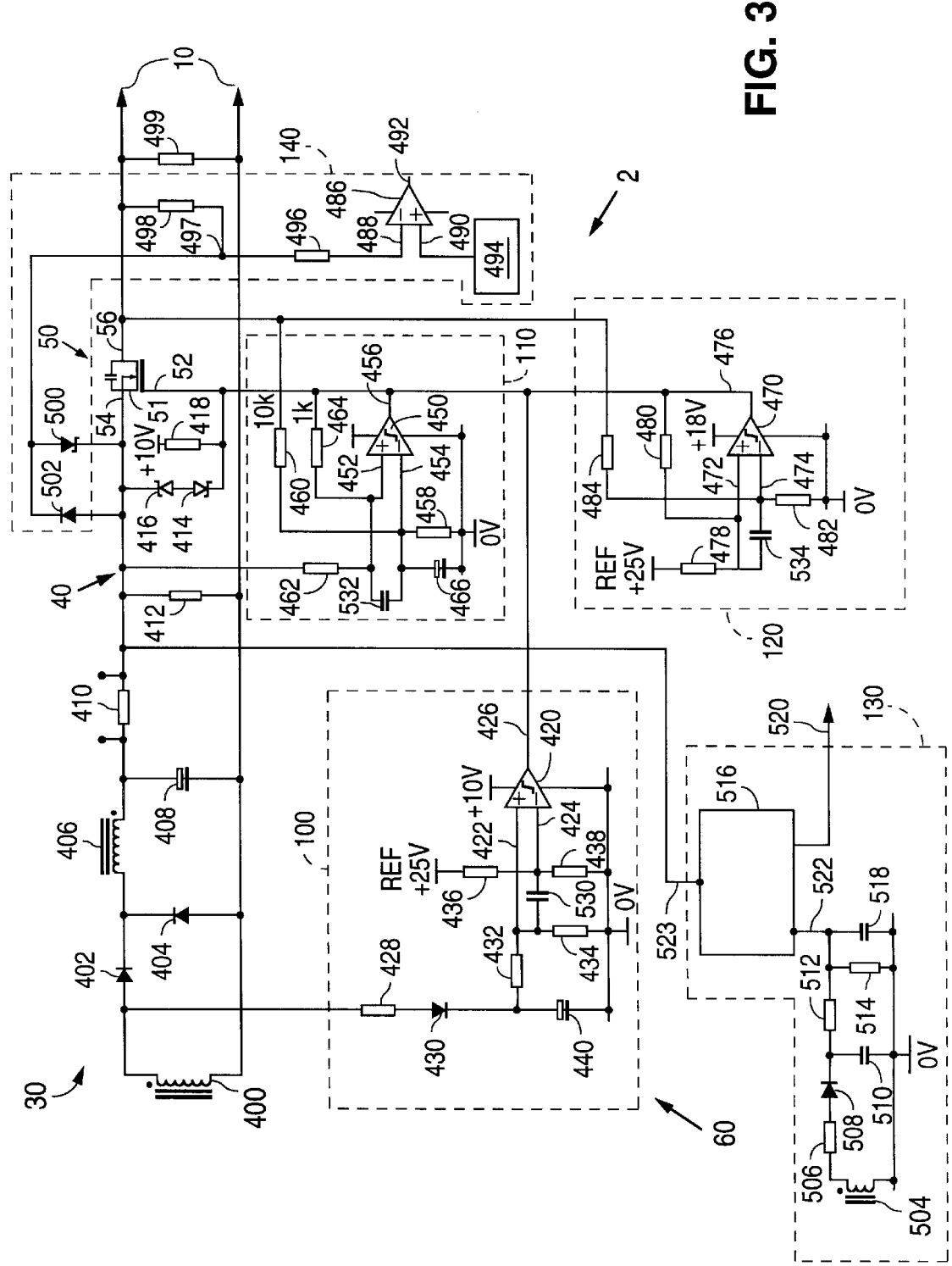
FIG. 3 is a schematic diagram of a preferred embodiment of a power converter module, ORing element and control circuit as shown in FIG. 1.

FIG. 3 illustrates a schematic diagram for a power supply module 30 according to a preferred embodiment of the invention. Commercial AC power is applied across terminals of a power source shown partially in the form of a secondary side of a transformer 400. The power is rectified by a rectifier comprising diodes 402 and 404, placed in series across transformer 400. A rectified voltage is applied to a filter circuit comprising an inductor 406 and capacitor 408. The converter circuit further includes a voltage divider formed from resistors 410 and 412, which provide reference points for current sensing and preloading of the power outputs, respectively.

Figure 4:
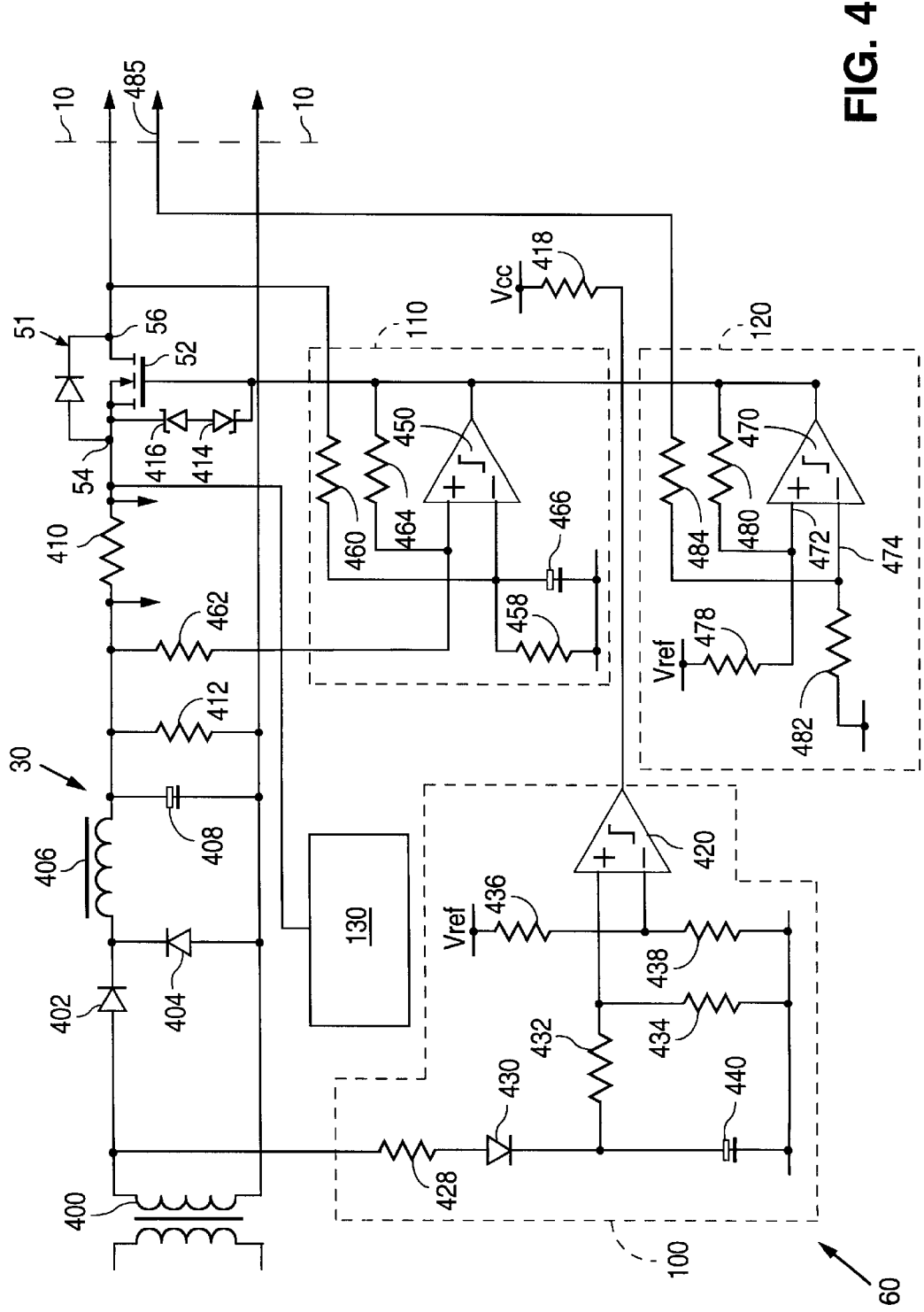
FIG. 4 is a combined block and schematic diagram of another embodiment of the power converter module, ORing element and control circuit of FIG. 3.

An ORing element in the form of a MOSFET device 51 is associated with each module and connected in series with a common bus 10 (as seen more clearly in FIGS. 1–2). MOSFET device 51 has a control node 52 and is operable to permit current flow across nodes 54 and 56. The MOSFET device is operated by a control signal in the form of a voltage applied to its gate that is supplied by a control circuit. The MOSFET device is turned off if the control circuit reduces its gate voltage to zero volts. The MOSFET device is used to isolate current generated at a corresponding power supply module from passing to the common bus when one or more of a plurality of conditions occur, indicating a failure in the system or module, and which will be described in detail hereinafter. In an alternative embodiment of the present invention, the converter circuit may be implemented in a more simplified manner as shown in FIG. 4 as will be described subsequently.

Referring back to FIG. 3, the control circuit 60 comprises a plurality of detectors 100, 110 and 120, a voltage monitoring circuit 130 and an error amplifier 140. Control circuit 60 is coupled to the ORing element 50 for controlling the operation of the ORing element when certain conditions occur. In a preferred embodiment of the invention, the control circuit will generate a control signal operable to turn off the MOSFET device under the following conditions: 1) a reverse current of sufficient magnitude flows in the MOSFET, indicating a short circuit component somewhere in the output circuit of the power supply; 2) the converter circuit fails to deliver conversion pulses, indicating that the power supply has failed to deliver any power to the load; and 3) the voltage on the remote sense lines rises above a certain level associated with selective OVP, indicating that a power supply is delivering too much voltage to the load. Furthermore, control circuit 60 ensures the correct timing for turning on the MOSFET device during power-up. This is true regardless of whether the other power supplies are turned on (warm power up) or not (stand-alone power up). The control circuit is accurate enough and fast enough so that no voltage spikes occur on the DC bus when the MOSFET device is turned on or off.

In particular, detector 100 is coupled to the control node 52 for detecting when a rectified voltage falls below an undervoltage value and to the source of AC power 400 to receive voltage pulses representing the rectified voltage. Detector 100 includes a comparator 420 having a pair of inputs comprising a noninverting input 422 and an inverting input 424. Input 422 is connected to receive the rectified voltage. Input 424 is connected to receive a reference voltage representing the undervoltage value. The comparator 420 further includes an output 426 connected to the control 52 node. The output 426 changes state when the inputs 422, 424 reach a voltage approximately equal to the undervoltage value. This state change in turn causes the selective decoupling of the output node 40 connected to MOSFET device 51 from the common bus, and is achieved by turning off the device.

Detector 100 further includes a resistor 428 connected in series to a diode 430, and a pair of voltage dividers coupled respectively to the pair inputs of the comparator 420. The first voltage divider is formed from two resistors 432, and 434, and is arranged to provide the rectified voltage to the noninverting input 422. Resistors 432 and 434 and capacitor 440 are selected to provide a long discharge time constant for detector 100. The second voltage divider is formed from two resistors 436 and 438, and is arranged to provide a reference voltage to the inverting input 424. Resistors 436 and 438 and capacitor 530 are selected to produce a time constant factor for detector 100. Resistor 428 and diode 430 are disposed between a voltage divider and the module. Detector 100 further includes a capacitor 440 arranged in parallel with a voltage divider as shown. The capacitor 440 and the resistor 428 are selected to provide a fast initialization of the MOSFET device when the module is initialized with power.

The schematic of a preferred embodiment of detector 110 is also shown in FIG. 3. Detector 110 operates to detect the occurrence of a short circuit present in the corresponding module, in particular in the converter circuit. Detector 110 is coupled to at least the control node and to the module. When the short circuit occurs, a reverse current flows across the MOSFET element. Detector 110 includes a comparator 450 having a noninverting input 452 and an inverting input 454. Input 452 is coupled to receive the reverse current from the MOSFET device and input 454 is coupled to receive a reference voltage which corresponds to a threshold current. Comparator 450 further includes an output 456 connected to the control node 52 for causing the MOSFET device to change state during an undervoltage condition occurring when the reverse current is approximately equal to a threshold current.

Detector 110 further includes a pair of voltage dividers coupled respectively to the pair of inputs of comparator 450. The first voltage divider is formed from two resistors 458 and 460, and is arranged to provide a reference voltage to the inverting input 454. The second voltage divider is formed from two resistors 462 and 464, and is arranged to provide the reverse voltage to the noninverting input 452. Detector 110 further includes a capacitor 466 coupled to and arranged in parallel with a voltage divider as shown. Capacitor 466 is selected to lower the value of the threshold current by holding one of the inputs 454 at a relatively constant voltage while the other input 452 falls sharply.

Capacitor 466 is also selected to provide a time lag in voltage rise at input 454 when the corresponding power supply module is initialized with power in a stand-alone mode. When a condition referred to as hot swap power up occurs, the common bus 10 (e.g., DC bus) has an operating voltage between 1 through 48 volts, depending upon components utilized and their manufacturing tolerances. Typical bus voltages are 3.3 volts, 5.0 volts, 12.0 volts, 24 volts and 48 volts. The voltage divider that includes resistor 464 is selected to increase the threshold voltage so that the comparator changes state when a voltage across the module 30 is approximately equal to the voltage at the DC bus 10 thereby causing the MOSFET device to change from an off state to an on state with no voltage glitches on the bus.

The control node 52 is coupled to a voltage source through resistor 418, and a resistor 499 is connected in parallel with the load for isolating leakage voltage originating at the voltage source from the control circuit when the MOSFET device is turned off. The positive going gate drive for the MOSFET device is provided via the resistor 418, which functions as a pull-up resistor in FIG. 3. The capacitance in the MOSFET device 51 will limit the gate voltage rise time to a few hundred microseconds. Any of the three comparators 420, 450 or 470 can pull down the gate or control node 52 and provide a sufficiently rapid turnoff time (e.g., of around 5 $\mu$s). All three comparator outputs 426, 456, and 476 must be turned to the off state for the voltage at the control node 52 to rise. Capacitors 530, 532 and 534 prevent false tripping of the respective comparators 420, 450, and 470 which may be caused by high frequency capacitively coupled noise. These capacitors are omitted in FIG. 4.

Also shown in FIG. 3, an output of detector 120 is coupled to the control node and operates to detect when the bus voltage exceeds an overvoltage value. Detector 120 includes a comparator 470 having a noninverting input 472 and an inverting input 474. Input 474 is connected to receive the voltage appearing at the load and connected to the common bus. Input 472 is connected to receive a reference voltage representing an overvoltage value. Comparator 470 further includes an output 476 connected to the control node 52 for causing the MOSFET device to change state and to selectively decouple the module from the load during an overvoltage condition occurring when said inputs 472, 474 reach a voltage approximately equal to the overvoltage value.

Detector 120 further includes a pair of voltage dividers coupled respectively to the pair of inputs of comparator 470. The first voltage divider comprises resistors 478 and 480 being arranged to provide a reference voltage at input 472. The second voltage divider comprises resistors 482 and 484 being arranged to provide the bus voltage to input 474.

Note that in FIG. 4, comparator 470 includes a pair of voltage dividers coupled respectively to the pair of inputs of said comparator. However, one of the voltage dividers is arranged to provide a reference voltage to input 472, representing the overvoltage value, and the other voltage divider is arranged to provide the remote sense voltage to input 474. The remote sense signal 485 of FIG. 4 is used to more accurately measure the load voltage and may employ an op-amp 90 as shown in FIG. 2 to further improve accuracy.

As noted, control circuit 60 may include detector 120 coupled to the control node, for detecting when the remote voltage exceeds an overvoltage value. In a preferred embodiment, resistor 484 should receive the voltage at the load. However, the connection of resistor 484 to the drain 56 of the MOSFET device in FIG. 3 is an approximation due to the voltage drop on the output cables of module 30 and DC bus. Ideally, resistor 484 should be arranged to receive the voltage at the load through line 485. Thus, a more accurate connection is to a circuit for sensing voltage located remotely to the power supply module, and as depicted in FIG. 4, resistor 484 should be connected to such a remote voltage sense circuit, which in the preferred embodiment is shown as a single op-amp 90 in FIG. 2 (e.g., connected as a differential amplifier).

Referring back to FIG. 3, at least two diodes 414 and 416 are connected in series and disposed between the terminal nodes 52 and 54 of the MOSFET device. These diodes may be Zener diodes and act to limit the voltage between the gate and source of the MOSFET device, or respectively nodes 52 and 54, to prevent failure of the MOSFET device under certain circumstances. Such circumstances include an excessive auxiliary supply voltage applied via resistor 418 to the gate (node 52) when the output voltage is zero, and voltage spikes applied to the output from an external source. The use of Zener diodes for diodes 414 and 416 overall protect against positive and negative transient voltages.

In FIG. 3, error amplifier 140 prevents a false undervoltage condition from arising when the MOSFET device 51 is in the on state and when an overvoltage condition occurs on the common bus from another power supply module 2, for example. Error amplifier 140 is operable for preventing an overvoltage condition in parallel mode, that is, when the corresponding module is initialized with power while a remaining number of modules are in operation. In FIG. 3, error amplifier 140 includes an operational amplifier (op-amp) 486 having an inverting input 488, a noninverting input 490 and an output 492. A reference voltage 494 is coupled to input 490 for providing a slow rise voltage and for preventing an output voltage overshoot. The slow rise voltage is also known in the industry as a soft-start. Moreover, a soft-start voltage source prevents false triggering of the selective OVP circuits. The soft-start must also function in conjunction with the remote on and off control, if used. Primary side soft-start circuits have a disadvantage in that the output voltage rise time will vary greatly with the load current. A secondary side soft-start circuit may thus be used in specifications calling for tightly controlled voltage rise time limits. The usual practice is to put the soft-start in the voltage reference of the error amplifier as represented in FIG. 3, which becomes operational when the feedback loop is closed. It will be appreciated that the error amplifier 140 and reference voltage 494 are represented by blocks since these may be varied with equivalent components. Error amplifier 140 further includes at least two resistors 496, 498 connected in series and disposed between the input 488 and the common bus. A diode 500 is coupled between resistor 498 and the source of the MOSFET device and is selected to prevent a false undervoltage condition. Diode 500 may be a Schottky device and together with resistor 498 form a voltage feedback loop across the MOSFET device. Voltage feedback is provided by resistor 498 from the DC bus, since it is the bus voltage that must be regulated. In many cases, resistor 498 will be preceded by a unity gain differential buffer 90 for remote sensing applications as illustrated in FIG. 2. Diode 500 keeps the feedback loop closed and prevents a false undervoltage condition from occurring if the MOSFET device is switched to an off state during an overvoltage condition occurring on the bus. Diode 502 is connected both in parallel to and in reverse polarity with diode 500 and is selected to prevent an overvoltage condition. Diode 502 keeps the feedback loop closed and prevents a possible overvoltage condition from occurring in a parallel mode when starting up or initializing a power supply module into a system with a large number of similar modules already in operation if the primary power limit is quite high. The resistor 498 and diode 502 are also arranged to provide a voltage feedback loop across the MOSFET device.

Control circuit 60 additionally may include a voltage monitoring circuit 130 when a converter module 30 receives a voltage signal beyond a predetermined range from line L and neutral N terminals of the power source module in FIG. 2. Circuit 130 monitors voltage at the source of the MOSFET device as shown in FIG. 3 and includes a circuit for supplying auxiliary power comprising an auxiliary power source 504, a converter circuit which comprises a resistor 506 connected in series with a diode 508 and a capacitor 510 all coupled across source 504. A voltage divider comprising resistors 512 and 514 is coupled to the converter circuit to provide the auxiliary power to an input 522 of a detector 516. A characterteristic of the power source 504 is that its voltage varies with the voltage present on the line L and neutral N terminals of the power source. As a consequence, detector 516 may generate a signal at output 520 indicating that the source of voltage is below a normal operating range.

Detector 516 is a multifunction component used for switchmode power supplies. It may be a discrete component and includes DC output voltage monitoring (e.g., OVP and UVP functions, determined by programmable values or preset by the manufacturer) for several DC output channels. The control circuit 60 makes use of the MOSFET device to implement selective OVP and UVP predetermined range of operation. Those skilled in the art will recognize that other devices could also be used, including voltage monitoring circuits built from discrete components. The selective function prevents detector 516, or equivalent thereof, from detecting an out-of-range output voltage unless the host power supply is at fault.

The output signal 520 is a multifunction output, which is to be connected to a customer's system so as to indicate that all DC output voltages are within the normal predetermined range. When signal 520 indicates a false condition, a UVP has occurred. Although not shown with detector 516 in FIG. 3, a FAULT output signal is used to shut down the power supply module if the OVP or UVP levels are exceeded on any of the monitoring channels. One of ordinary skill in the art is able to provide additional components and circuitry to adapt OVP and UVP levels of detector 516 set by the manufacturer. The PSON signal is a logic signal from a customer's system that is fed directly into the OFF pin (not shown) of detector 516. The signal causes the FAULT signal to activate so that the PSON signal can shutdown the power supply or turn it back on. This signal is sometimes called a remote on/off. However, the function may be used whether or not the MOSFET device is used and is also used in non-redundant systems.

A capacitor 518 is connected to the voltage divider, wherein the capacitor 518 and resistor 512 are selected to provide a time constant that causes detector 516 to produce output signal 520 for indicating that the preset range has been exceeded. Another input 523 of detector 516 is connected to receive the voltage signal from the source of the MOSFET device. The output signal 520 changes between high and low voltage states, and resistor 512 is selected to cause the output signal 520 to change to a low voltage state before the converter module loses regulation voltage, wherein a low voltage state indicates a power supply failure.

The primary side DC bulk voltage is monitored by peak rectification of the auxiliary secondary voltage 504 in forward mode. A fall in this signal level is detected by an input 522 of detector 516. To be effective, the auxiliary supply should be powered from the DC bulk capacitor. A fast time constant is desired for the rectifier circuit to avoid unwanted time delays. The main DC-to-DC converter cannot be used for bulk voltage sensing since pulses may be temporarily lost during step load changes.

Having discussed the detailed circuits and embodiments of the power supply system 1, ORing element and control circuit according to the present invention, the method of operation of the present invention will be described below.

Converter Failure Detection

In the operation of detector 100, comparator 420 is referenced as the converter fail comparator. Whereas with the prior art, if the ORing element were a Schottky diode and the voltage (e.g., typically +5V) of the converter circuit output fails, the diode would simply reverse bias and allow its anode voltage to fall, thereby causing an output undervoltage condition and indicating a failure. With the present invention, detector 516 is used to detect an overvoltage or undervoltage condition. When an undervoltage condition is detected, the detector 516 indicates a failure in the power supply module by pulling output 520 low. However, with a low resistance MOSFET device, the voltage at the source is tied to the DC bus voltage. The purpose of comparator 420 is to turn off the MOSFET device 50 if pulses from the source of AC power 400 are lost. This allows a normal undervoltage indication to occur. High values for resistors 432 and 434 help to generate a long discharge time constant. This allows a temporary loss of pulses to occur during step load changes without falsely tripping comparator 420. A low value of resistor 428 assures a fast charge of capacitor 440 and a fast turn on of the MOSFET device at start up. The reference voltage of 2.5 volts is provided by resistors 436 and 438 to help generate correct time constants for the detector 100.

A low reference voltage has a possible advantage of requiring a lower value of timing capacitor but it is not critical to the circuit operation. In most cases, a reference voltage of +2.5 volts is used in order to save components. The voltage divider comprising resistors 436 and 438 may be omitted for simplicity.

Reverse Voltage Detection

Still referring to FIG. 3, in order to protect the DC bus, if capacitor 408, diode 402 or diode 404 encounters a short circuit, the DC bus voltage must not be affected. In this situation, the MOSFET device must be turned off to allow an undervoltage failure indication, but in this case it must be turned off fast, (e.g., that is, near 5 $\mu$s), before the reverse current builds up to the point of causing a voltage dip on the DC bus.

Comparator 450 senses the reverse current by monitoring the reverse voltage across the MOSFET device. A negative going trip threshold may be set to −0.27V (+4.73V at the source). This equates to a reverse current trip point of 45A in a 6 milli-ohm MOSFET device.

In the case of an instantaneous component failure, capacitor 466 causes the circuit to trip at a much lower reverse current. This is because much of the negative going voltage transient resulting from a short circuit will occur across the inductance of the output cables, rather than at the MOSFET device. The net effect is that both the source and drain of the MOSFET device will initially fall together before the reverse current builds up. Capacitor 466 holds the inverting input 454 of comparator 450 constant so that only the noninverting input will fall and will trip comparator 450. Although it is still possible that some sort of slow burnout of components over a few milliseconds could draw enough current to pull down the bus, the likelihood of such a failure is assumed to be fairly small.

Preventing False Triggering

One possible problem with comparator 450 is that the noninverting input 452 will see a voltage dip during a step load increase, which may cause false tripping. This would result in a larger than expected voltage dip at the load due to the extra voltage drop across the internal parasitic diode in the MOSFET device. If this is a problem, either the dynamic response of the power supply module must be improved or the reverse voltage threshold of comparator 450 must be increased. Removal of capacitor 466 would eliminate the problem but additional comparators need to be added to generate the same functions that capacitor 466 provides.

Protection During Power up

Comparator 450 also aids the correct switching of the MOSFET device during power up (e.g., initialization) of the module. In a parallel mode, when a particular power supply module is powered on in a power supply system with other power supply modules already in operation, the voltage at the drain of the MOSFET device will already be at a certain level (e.g., say, +5.00 volts). With hysteresis occurring via resistor 464, the threshold of comparator 450 is increased (e.g. +4.90 volts). When the voltage across capacitor 408 has risen to a certain level (e.g., +4.90 volts), comparator 450 will cause the MOSFET device 51 to selectively couple the module to the load (e.g., it will turn on), and connect capacitor 408 to the DC bus. Since there is very little voltage difference across the MOSFET device at this time, there will not be a voltage glitch on the bus. For practical purposes, the output voltage of the incoming power supply module could be set a little higher than the bus.

When powering up a power supply module in a stand-alone mode, the drain and source of the MOSFET device will start at zero volts. In this case, capacitor 466 is large enough to cause a time lag in the voltage rise at the inverting input 454 of comparator 450. The noninverting input 452 will follow the voltage at capacitor 408 so that the output 456 of comparator 450 will be released as soon as the voltage on capacitor 408 begins to rise. A fast attack time constant of comparator 420 also causes its output 426 to release very early. The result is that the MOSFET device is selectively coupled (or turns on) within the first one volt of output rise yielding a smooth upper portion of the voltage waveform which is monotonic (not shown).

Voltage Monitoring

With the load connected to the DC bus, detector 516 monitors the DC voltage at the source 54 of the MOSFET device 51. The low resistance across the drain and source $R_{DS(on)}$ of the MOSFET device 51 causes the voltage at the source 54 to be almost the same as the DC bus voltage, except for an additional voltage drop (e.g., 120 mvolts at full load). When the MOSFET device is in the off state, the voltage at the source is free to vary from zero volts up to a limit of about one volt above the DC bus voltage due to the internal parasitic diode in the MOSFET device. This scheme allows a fairly simple control strategy but has the potential disadvantage in that the undervoltage limit may have to be relaxed. However, it turns out that the overvoltage limit is not greatly affected.

Selective Overvoltage Protection

In the N+1 parallel redundant power supply system, when an overvoltage condition occurs it is important to shut down the failed power supply module and to permit the remaining operational modules to continue operating. Due to production tolerances, if only the bus voltage is sensed, it is possible that a functioning power supply module will shut down first, which would cause the system to crash. Consequently, the selective overvoltage protection feature of the present invention causes only the failed power supply module to shut down, thus leaving the remaining modules to deliver power to the load.

When a power supply module incurs an overvoltage condition, it causes a break in the voltage feedback loop created by resistor 498 and diodes 500, 502 of FIG. 3. With two or more power supply modules 2 connected in parallel, the DC bus voltage cannot increase if the total load current is high enough to allow one or more functioning modules 30 to supply current. The functioning modules 30 will regulate the DC bus voltage while the failed module(s) will act as a current source, if it does not completely fail. Therefore, if the voltage at the DC bus is rising out of control, all operational modules 2 must be supplying zero current. This situation is advantageous for the detector 120.

To implement selective overvoltage protection, comparator 470, which may be disposed within each power supply module, monitors the DC bus voltage and acts to selectively decouple or turn the MOSFET device 51 to an off state when the bus voltage reaches a certain level (e.g., about 5.60 volts). This threshold is chosen to be below the lower limit of the overvoltage protection threshold of detector 516. It does not matter which power supply module trips comparator 470 first.

For example, if a rising overvoltage condition on the bus occurs, the selective overvoltage comparators 470 in each module 2 have tripped and each respective MOSFET device has turned off. In those modules that have the overvoltage condition, the voltage at the source of the MOSFET device will immediately go one diode drop higher and will trip the detector 516 (e.g., typically at a voltage of 5.9 volts) and shut down the corresponding module. The DC bus voltage will not rise above a certain level (e.g., 5.6 volts) due to the diode drop occurring across the MOSFET device. The bus voltage will then fall, and the MOSFET device in the functioning module(s) will change state and turn on again (if it had turned off) and the functional module(s) will again support the load. Only a small voltage dip will be seen on the bus during this changeover. In most instances, the selective overvoltage comparator 470 in the module experiencing the failure will trip first due to the additional voltage drop across $RS_{(on)}$; however, one skilled in the art will recognize that this situation may vary depending upon component tolerances.

Typically what occurs within a module 30 which has failed during an overvoltage condition by a fast open circuit of its voltage feedback is that the module will shut down and the peak bus voltage will be limited to a certain level (e.g., about 5.6 volts) near the output node 40. As the bus voltage falls, the MOSFET device 51 will change state and turn on again at a level determined by the hysteresis of comparator 470. Although the MOSFET device 51 may turn off sometime later due to lack of converter pulses detected at comparator 420, this temporary re-enabling of the MOSFET device is a minor disadvantage of this simple circuit which is not expected to cause any problems.

Where a module is functioning properly on the bus with a slow rising bus voltage, the output current of the module would have been zero and its feedback loop would have been saturated at zero duty. In such a case, the voltage at the source of the MOSFET device which is in the off state will fall until the feedback loop recloses via diode 500. Diode 500 prevents a false undervoltage condition and false indication that the module has failed.

In an example where a properly functioning module experiencing a fast rising overvoltage condition on the bus, the voltage at the source of the MOSFET device rises above the bus voltage since the error amplifier 140 is unable to reduce the current to zero instantaneously. Because the overvoltage preset limit in detector 516 may not consistently trip, a faster response from the error amplifier would help. The MOSFET device is expected to turn off before the bus voltage rises above a certain level (e.g., about 5.5 volts). After the gate drive is re-established, the bus voltage may continue to fall while the error amplifier slews back to a steady state condition. The error amplifier must re-establish control before the source voltage falls below a certain level (e.g., 4.73 volts), representing the turn-off threshold level of comparator 450, in order to prevent an additional pulse on the gate drive. Such a pulse may cause a narrow voltage dip (e.g., of around 4.5 volts) on the bus.

To prevent a false overvoltage condition from occurring when initializing power to the system 1, a first module 30 to initialize with power would have to charge the DC output capacitors of all the modules on the bus. This results because all MOSFET devices are already turned on, unlike the Schottky diodes of the prior art which automatically block reverse current flow. With a high power limit, this module is permitted to supply enough current to develop close to a one volt drop across the MOSFET device and its output cables (and hence its OVP). By the addition of diode 502, a feedback loop is closed thereby regulating the voltage at the source to less than the OVP limit. Under steady state conditions, diode 502 does not conduct. Under actual OVP conditions, the feedback loop loses control so that diode 502 has no effect.

Undervoltage Protection in a Redundant Parallel Power Supply System

In an N+1 parallel redundant power supply system, if a module 30 fails, the remaining modules will support the load. Accordingly, a tightly controlled undervoltage protection ("UVP") is not required for the present invention. It is most important that a failed module produce a failure signal via output 520, so that it may be replaced as soon as possible. In the arrangement presented in FIG. 3, the UVP is mainly used for failure indication. It will be appreciated by those skilled in the art that the UVP limit in the detector 516 is modifiable with the addition of appropriate components.

Preventing a False UVP Condition in a Functioning Power Supply Module

During an overvoltage condition occurring on the bus, the MOSFET device in a functioning module is turned off, wherein the voltage at the source falls and a feedback loop is closed with diode 500. A slight negative dip in voltage at the source of the MOSFET device occurs the instant that diode 500 begins to conduct due to the limited slew rate of the error amplifier 140. Since the power supply module is operational in that there is no failure condition, it is important that the UVP limit of detector 516 is not crossed otherwise a false signal is generated on output 520, or worse yet, the module will be latched off.

With diode 500 conducting, the voltage at node 497, connecting diode 500, and resistors 496 and 498 will be controlled to its normal value, that is, the voltage will be slightly below the bus voltage and dependent upon the ratio of resistors 496 and 498. The voltage at the source of the MOSFET device 51 will stabilize at one Schottky diode drop below the voltage of node 497. Therefore, resistor 498 must be made as small as possible compared with resistor 496 in order to keep the voltage at the source away from the UVP threshold value. Resistor 498 is limited by the amount of current to be drawn through it if the voltage at the source falls to zero, which will happen during warm swapping without the AC power supply powered on.

Detector 516 and an Alternative to Lowering Input Voltage

It will be appreciated by those skilled in the art that a discrete circuit could be designed to be equivalent to the detector 516, however the component count therein should be kept to a minimum. A preferred detector 516 would have a low UVP threshold (e.g., a +4.0 volt level instead of a +5.0 volt level).

One way to lower the UVP of detector 516 is with the use of a circuit having a resistor being kept small so as to minimize the voltage drop caused by the input resistance of the detector 516. The voltage at detector 516 is not critical so long as it does not cross the OVP or UVP limits. The voltage at the source of MOSFET device 51 then may be coupled to detector 516 in a manner that not only pulls down the voltage input of detector 516 during UVP, but raises the trip voltage point at the source of MOSFET device 51. It will be apparent to those skilled in the art that the bus voltage will still not exceed the selective OVP limit by very much because of the diode drop in MOSFET device 51 when turned off.

Overtemperature Protection ("OTP")

If the MOSFET device 51 were to overheat for some reason, a short circuit may result. The MOSFET device may overheat if it fails to turn on due to a malfunction in the control circuit and if the output current is high. The current will pass through the internal parasitic diode (e.g., which has a typical forward voltage drop around 1.0 volts compared with the typical voltage drop of 120 milli-volts when the MOSFET is turned on). Therefore the power dissipation would be almost 10 times the expected dissipation.

Figure 5:
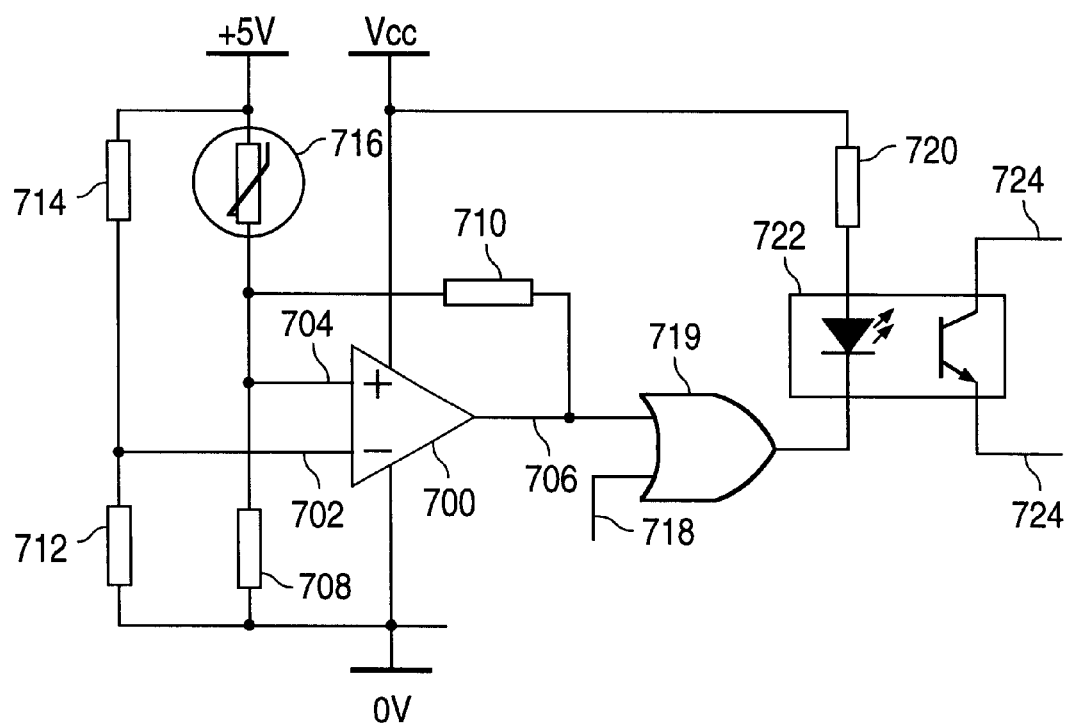
FIG. 5 is schematic diagram of a circuit for overtemperature protection of the present invention.

In a parallel redundant power supply system, if the module with the overheated MOSFET device subsequently fails for some other reason, the MOSFET device cannot turn off and an UVP condition cannot occur. The failure to deliver power would also go unnoticed leaving the system in danger of crashing if another module failed. Consequently, to ensure that these situations do not occur and to ensure high reliability in the system, since other MOSFET devices in the parallel redundant power supply system would still behave normally, overtemperature protection ("OTP") is desired. OTP may be included on the heatsink of the MOSFET device 51. One embodiment for providing OTP is shown in FIG. 5. One of ordinary skill in the art will recognize that any circuit with similar function may be substituted. Should a false trip of the module occur because of OTP, at least it will cause a failure alarm and the module may be replaced.

A negative temperature coefficient thermistor 716 is coupled with the heatsink of the ORing element 50. A voltage divider comprising resistors 712 and 714 generates a fixed reference voltage (e.g., 2.5 volts) which is fed to the inverting input 702 of op-amp 700. A second voltage divider is formed by resistors 708 and thermistor 716. The voltage at the noninverting input 704 is normally less than a certain amount (e.g., 2.5 volts), so that the output 706 is low.

If the temperature of the ORing element rises too high, the resistance of the thermistor 716 will fall and cause the voltage at the noninverting input 704 to exceed a certain level (e.g., 2.5 volts). A typical cutoff temperature might be 120 degrees centigrade, but may vary according to the MOSFET ratings. This causes output 706 to go to a logic state of a logical high. A logic high state also appears at the output of the gate 719 and causes the current in the opto-coupler 722 to fall to zero. This shuts down the power supply so that the output current flowing in the ORing element will fall to zero. The temperature of the MOSFET device will then slowly begin to fall.

Resistor 710 causes hysteresis so that the temperature of the ORing element must fall significantly before the circuit recovers to its normal state and turns on the power supply again. The circuit may also incorporate a latching function (not shown) to keep the power supply off after the overtemperature condition, depending on a customer's requirements. The power supply must also turn off if the FAULT signal 718, as seen in FIG. 5, from detector 516 goes to a logic high, for example during an output overvoltage. The FAULT signal has been ORed (e.g., combined by logical OR function) with the output of the overtemperature circuit so that only one opto-coupler is necessary. It will be appreciated by those skilled in the art that a discrete circuit may replace gate 719 and alternatively, a second opto-coupler or some other equivalent method to shut down the power supply may be substituted.

Soft Start with Paralleled Power Supply Units

When initializing a power supply with power while the DC bus already is at a voltage level ("live bus"), otherwise known as a "warm plug" situation, comparator 450 will hold the MOSFET device 51 off until the voltage across the MOSFET device is nearly zero. The remote voltage feedback will already be at a certain level (e.g., +5 volts) via resistor 498, which holds the output 492 saturated at a zero duty cycle. If the feedback loop is broken, a soft start voltage rise cannot function. When the reference voltage approaches its final value, the op-amp 486 will activate and capacitor 408 will begin to charge at the maximum rate. A resulting voltage overshoot may cause an OVP condition on the DC bus. The present invention overcomes this false OVP condition. It will be appreciated that with the current invention, when the MOSFET device is initialized with power, although the MOSFET device is in an off state, diode 500 will pull down the feedback voltage close to the voltage appearing at capacitor 408. As a result, the feedback loop will already be closed via diode 500, which allows the rate of rise of the voltage at capacitor 408 to be controlled by the soft-start to be relatively slow so that a voltage overshoot does not occur.

Gate Insulation Breakdown

To minimize power loss, the resistance between the drain and the source ("$R_{DS(ON)}$") of the MOSFET device 51 is minimized by using a high gate-to-source voltage. In the case of a +12 volts output from the power supply module, the auxiliary voltage would need be at least +20 volts since the output voltage is influence by the gate voltage, or more specifically subtracts from the gate voltage. However, during start up in the stand-alone mode or during a short circuit occurring at the output, the full auxiliary voltage may appear across the gate and source of the MOSFET device, and may possibly cause a failure in the MOSFET. Zener diodes 414 and 416 prevents the gate-source voltage of MOSFET device 51 from exceeding its ratings under any condition.

Summary of Operation

At power-up of a power supply module in the stand alone mode, the voltage at the DC bus is at zero volts. The output 476 of detector 120 begins at a high state. The output 426 of detector 100 goes high immediately after pulses appear from the source of AC power 400. The output 456 of detector 110 goes high within the first one volt rise across capacitor 408. Initially, the feedback loop is open MOSFET device 51 is in an off state. MOSFET device 51 will turn on when the voltage across capacitor 408 rises one volt and the voltage feedback loop is formed with resistor 498. The output voltage of the power supply module will rise with a small initial step (approximately less than one volt, that is, within constraints of manufacturing tolerances for components, temperature, and other factors in component specifications) and then will continue to rise monotonically under the control of the error amplifier 120 and the slow rising voltage reference 494.

At power-up of a power supply module in parallel mode, the voltage at the DC bus will be a nominal voltage (e.g., +5.0 volts). The output 476 of detector 120 is high. The output 426 of detector 100 goes high immediately after pulses appear from the source of AC power 400. The output 456 of detector 110 starts low because the voltage on the DC bus is higher than across of capacitor 408. Regarding the error amplifier 140, initially a feedback loop is formed with diode 500 and resistor 498, which behaves like a pull-up resistor. The voltage across capacitor 408 will rise under the control of error amplifier 140 and the slow rising voltage reference 494. The output 456 of detector 110 will be held low by the voltage at the DC bus until the voltage across of capacitor 408 reaches a certain level (e.g., 4.90 volts). The MOSFET device will turn on when the voltage across capacitor 408 is approximately equal to the voltage at the bus.

AC Power Failure or Power Down

When the source of AC voltage 400 fails or when the power converter module 30 powers down in a stand alone mode, the voltage at the DC bus will collapse when the MOSFET device is turned off. The output 476 of detector 120 stays at a high state. The output 426 of detector 100 holds a high state because components are selected to provide a long time constant. The output 456 of detector 110 goes low because the voltage across capacitor 466 maintains its high state as the voltage across capacitor 408 falls. As the primary bulk voltage falls, the auxiliary pulse amplitude at transformer 504 also falls. Capacitor 518 and resistor 514 together contribute to a short time constant, and as a result, detector 516 will trip before the break of regulation and produce an AC fail indication signal on output 520. Although not shown, the bulk voltage OK signal (BOK), representing the high DC voltage which feeds the output DC-to-DC converter, is below its minimum allowed value and will inhibit pulses. As the output voltage at 40 falls, capacitor 466 will maintain its voltage and cause the output of detector 110 to change to a low state when the voltage across capacitor 408 falls below a certain value (e.g., approximately +4.73 volts). The MOSFET device 51 will then be turned off. The time constant influenced by capacitor 466 and resistor 460 must be selected to hold the output 456 of detector 110 at a low state during the discharging of capacitor 408 by resistor 412; otherwise, MOSFET device 51 may experience a bounce, changing between on and off states before full discharge of the capacitor occurs. Eventually, the output 426 of detector 100 will go low and turn off the MOSFET device 51.

When the source of AC voltage 400 fails or when a power converter module powers down in a parallel mode, the voltage at the DC bus will remain at a nominal level (e.g., +5.0 volts). The output 476 of detector 120 stays at a high state. The output 426 of detector 100 will fall after a delay. Since the MOSFET device 51 is on, it will prevent the output 456 of detector 110 from going low, so it will initially stay at a high level. As the primary bulk voltage falls, the auxiliary pulse amplitude at transformer 504 also falls. Capacitor 518 and resistor 514 together contribute to a short time constant, and as a result, detector 516 will trip before the break of regulation and produce an AC fail indication signal on output 520. The BOK signal will eventually inhibit pulses. With the MOSFET device turned on, the voltage across capacitor 408 is tied to the voltage at the DC bus. Eventually, as capacitor 440 discharges, the output 426 of detector 100 will change to a low state and cause MOSFET device 51 to turn to an off state.

Overvoltage Conditions

In a stand-alone mode, the voltage at the DC bus will increase slowly until it is over the predetermined overvoltage level and for all purposes be considered out of control. The MOSFET device 51 is at an on state. The output 476 of detector 120 will change to a low state when the voltage at the DC bus reaches a certain level (e.g., +5.6 volts). The MOSFET device will be turned off (e.g., within 5 μs) and introduce a diode drop across the device. The voltage across of capacitor 408 will increase, and detector 516 will sense the OVP level and will latch off the power supply module.

In a parallel mode, the voltage at the DC bus of the corresponding power supply module of interest will increase slowly while all the remaining power supply modules all have an output current of zero. The MOSFET device 51 is at an on state. The output 476 of detector 120 will go to a low state when the voltage at the bus reaches a certain value (e.g., 5.6 volts). The MOSFET device will be turned off (e.g., within 5 μs) and introduce one diode drop across the device. The voltage across of capacitor 408 will increase, and detector 516 will sense the OVP level and will latch off the power supply module. In "good" power supply modules (e.g., functioning and operating properly), the output current must be zero for the voltage at the bus to increase. The error amplifier 140 in the good modules causes pulses to cease and after a delay, the output 426 of detector 100 goes low. The MOSFET device 51 turns off and capacitor 408 discharges until a feedback loop is completed with diode 500. Pulses from the power supply return and the MOSFET device 51 turns on again. This bounce cycle continues in the good modules, but the MOSFET device does not conduct output current. When the overvoltage condition ceases to exist at the DC bus, the MOSFET device will again turn on and capacitor 408 will only need to acquire a minimal charge to reach a predetermined level (e.g +5.0 volts).

Short Circuit of Diodes 402, 404 or Capacitor 408

In stand-alone mode, the voltage at the DC bus is at a nominal value (e.g., +5.0 volts). The MOSFET device is turned on because the outputs 426, 456, and 476 of the comparators 420, 450 and 470 are high. As the voltage across of capacitor 408 falls rapidly, capacitor 466 will hold its voltage and cause the output 456 of detector 110 to go low during the discharge of capacitor 408 by a short circuit. The MOSFET device will therefore be turned off so that the short circuit does not appear across the DC bus.

In the parallel mode, the voltage at the DC bus is at a nominal value (e.g., +5.0 volts). The MOSFET device is turned on because the outputs 426, 456, and 476 of the comparators 420, 450 and 470 are high. When a short circuit exists in diodes 402, 404 or capacitor 408, as the voltage across capacitor 408 rapidly falls, capacitor 466 will hold its voltage and cause the output 456 of detector 110 to go low when the voltage across capacitor 408 falls below a predetermined value (e.g., 4.73 volts). The MOSFET device will then be turned off rapidly. The turn off time should be selected to ensure that most of the reverse voltage drop occurs in the output cable inductance. Therefore, the voltage dip on the DC bus is minimal.

In the parallel mode when there is a functioning power supply module, the functioning module will take up the whole load which may be up to a 50% step load increase in the worst case. The voltage at the bus will dip slightly according to the normal 50% step load response.

It will be recognized that the operation described above is similar for both the stand-alone and parallel modes because capacitor 466 stores the output voltage, which happens to be the bus voltage, in both modes.

Step Load Response of the Power Supply Module Will Not Fall to the UVP Level

In a stand-alone mode, the voltage at the DC bus is at a nominal value (e.g., +5.0 volts). The output 426, 456 and 476 of the detectors 100, 110 and 120 are high. The MOSFET device is turned on and experiences a resistance across its nodes (e.g., 6 milli-ohms). Regarding error amplifier 140, a feedback loop is closed with resistors 498 and 496. The step load increase will cause a voltage dip at the output 40 and also across of capacitor 408. For a fast dI/dt, the dip depends upon the ESR of capacitor 408 and resistor 410. For a slow dI/dt, the dip depends more on the dynamic response of the feedback loop. If the dip falls below a predetermined value (e.g., +4.73 volts), comparator 450 will turn off the MOSFET device 51 and its internal diode will conduct up to about a one volt drop, depending on the load. Therefore, the output voltage dips are expected to be up to one volt worse.

This situation is undesirable and may be corrected by using a capacitor 408 having a lower ESR, by using a current sense resistor 410 with a lower value, or by adjusting the threshold of comparator 450 to be lower than a particular level (e.g., 4.73 volts of the example used herein).

While the present invention has been particularly described with respect to the illustrated embodiments, it will be appreciated that various alterations, modifications and adaptations may be made based on the present disclosure, and are intended within the scope of the present invention. While the present invention has been described in connection with what is presently considered to be the most practical and preferred embodiments, it is to be understood that the present invention is not limited to the disclosed embodiments, but to the contrary, is intended to cover various modifications and equivalent arrangements included within the scope of the appended claims.

What is claimed is:

1. A power supply system, comprising:
    a load connected to a common bus; and
    a plurality of power modules each having an output node, an ORing element operable to selectively couple and decouple said output node to the common bus, and a control circuit for controlling the operation of each ORing element, wherein said control circuit outputs a control signal in response to the occurrence of a predetermined condition, the control signal operating the ORing element to cause the selective coupling and decoupling of the output node from the common bus, and wherein said control circuit is adapted to prevent voltage spikes from occurring at the common bus during the selective coupling and decoupling.

2. The power supply system of claim 1, wherein said ORing element includes a control node and is operable to permit current flow between the common bus and the corresponding output node, wherein said control signal is applied to the control node.

3. The power supply system of claim 2, wherein said control circuit includes a detector for detecting when a rectified voltage falls lower than an undervoltage value, said detector being coupled to the control node and to a source of voltage pulses representing the rectified voltage.

4. The power supply system of claim 3, wherein said detector includes a comparator having a pair of inputs, wherein one of said inputs is connected to the source of voltage pulses and the other of said inputs is connected to a reference voltage representing the undervoltage value, said comparator further having an output connected to the control node for causing the selective coupling and decoupling when said inputs reach a voltage approximately equal to the undervoltage value.

5. The power supply system of claim 4, wherein said detector further includes a resistor connected in series to a diode, a pair of voltage dividers coupled respectively to the pair of inputs of said comparator, wherein one of said voltage dividers is arranged to provide the voltage pulses to one of said inputs and to establish a long discharge time constant for the detector, and the other of said voltage dividers is arranged to provide the reference voltage to the other of said inputs and to produce a time constant factor for the detector, wherein said resistor and said diode are disposed between one of said voltage dividers and the module, and a capacitor arranged in parallel with one of said voltage dividers, said capacitor and said resistor being arranged to provide a fast initialization of the ORing element when the module is initialized with power.

6. The power supply system of claim 2, wherein said control circuit includes a detector for detecting when a short circuit is present in the corresponding module, said detector being coupled to at least the control node.

7. The power supply system of claim 6, in which a reverse current flows through the ORing element when said short circuit occurs, and said detector includes a comparator having a pair of inputs, wherein one of said inputs is coupled to receive the reverse current and the other of said inputs is coupled to receive a reference voltage, said reference voltage corresponding to a threshold current, said comparator further having an output connected to the control node for causing said selective decoupling during an undervoltage condition occurring when said reverse current is approximately equal to the threshold current.

8. The power supply system of claim 7, wherein said detector further includes a pair of voltage dividers coupled respectively to the pair of inputs of said comparator, wherein one of said voltage dividers is arranged to provide the reference voltage at one of said inputs and the other of said voltage dividers is arranged to provide a voltage representative of the reverse current to the other of said inputs, and a capacitor coupled to one of said voltage dividers to increase the sensitivity of the detector to instantaneous current flow.

9. The power supply system of claim 8, wherein said capacitor provides a time lag in voltage rise at one of said inputs when said module is initialized with power in a stand-alone mode.

10. The power supply system of claim 8, in which said common bus is connected to a DC bus having a predetermined operating voltage, and wherein one of the voltage dividers includes a resistor for increasing the threshold voltage so that said comparator changes state and turns on the ORing element when the voltage across the ORing element is approximately zero.

11. The power supply system of claim 10, further comprising a resistor connected across the load, wherein said control node is coupled to a voltage source, and said resistor isolates leakage voltage originating at the voltage source from passing to said control circuit when said selective decoupling occurs.

12. The power supply system of claim 6, wherein said detector includes a comparator having a pair of inputs and an output coupled to the control node, wherein one of said inputs is coupled to receive a converter voltage for causing the output of the comparator to change state when said converter voltage increases by approximately one volt and for causing said selective decoupling.

13. The power supply system of claim 2, wherein said common bus operates at a bus voltage, and said control circuit includes a detector for detecting when the bus voltage exceeds an overvoltage value.

14. The power supply system of claim 13, wherein said detector includes a comparator having a pair of inputs, wherein a first of said inputs is connected to receive the bus voltage and the other of said inputs is connected to receive a reference voltage, said reference voltage representing the overvoltage value, said comparator further having an output connected to the control node for causing said selective decoupling when said first of said inputs reaches a voltage approximately equal to said reference voltage.

15. The power supply system of claim 14, wherein said detector further includes a pair of voltage dividers coupled respectively to the pair of inputs of said comparator, wherein one of said voltage dividers is arranged to provide the bus voltage at said first of said inputs, and the other of said voltage dividers is arranged to provide the reference voltage to the other of said inputs.

16. The power supply system of claim 1, wherein said load is connected to a DC bus.

17. The power supply system of claim 1, wherein said common bus is connected to a circuit for sensing voltage at a remote load, said remote sensed voltage being used for eliminating the effects of a voltage drop appearing across the common bus and associated connections.

18. The power supply system of claim 17, wherein said circuit for sensing remote voltage comprises a single op-amp operating as a differential amplifier.

19. The power supply system of claim 17, wherein said control circuit includes a detector for detecting when the remote sensed voltage exceeds an overvoltage value, said detector being coupled to the control node.

20. The power supply system of claim 19, wherein said detector further includes a comparator having a pair of inputs, and a pair of voltage dividers coupled respectively to the pair of inputs of said comparator, wherein one of said voltage dividers is arranged to provide a reference voltage at one of said inputs, said reference voltage representing the overvoltage value, and the other of said voltage dividers is arranged to provide the remote sense voltage to the other of said inputs.

21. The power supply system of claim 20, wherein one of said inputs is connected to receive the remote sense voltage and the other of said inputs is connected to receive the reference voltage, said comparator further having an output connected to the control node for causing the selective decoupling during an overvoltage condition occurring when said inputs reach a voltage approximately equal to the overvoltage value.

22. The power supply system of claim 19, wherein said comparator further includes an output connected to at least the control node for causing the selective decoupling when both inputs reach a voltage approximately equal to the overvoltage value.

23. The power supply system of claim 2, wherein said control circuit includes an error amplifier for preventing a false undervoltage condition arising when the ORing element is uninitialized and when an overvoltage condition occurs on the common bus.

24. The power supply system of claim 23, wherein said error amplifier is operable for preventing the overvoltage condition when the corresponding module is initialized with power while a remaining number of said modules are in operation.

25. The power supply system of claim 24, wherein said error amplifier includes
   a comparator having a pair of inputs and an output,
   a reference voltage coupled to one of said inputs for providing a slow rise voltage and for preventing a voltage overshoot,
   at least two resistors connected in series and disposed between the other of said inputs and the common bus,
   a first diode coupled between the resistors and the ORing element, and
   a second diode connected both in parallel to and in reverse polarity with the first diode,
   wherein one of said resistors and either of the first and second diodes are arranged to provide a voltage feedback loop across the ORing element, wherein the first diode operates to prevent the false undervoltage condition, and wherein the second diode operates to prevent the overvoltage condition.

26. The power supply system of claim 25, wherein the first diode is a Schottky diode.

27. The power supply system of claim 26, wherein the first diode and one of the resistors are connected in series to provide said feedback loop when the false undervoltage occurs, and the second diode is connected in series with one of the resistors to provide the feedback loop when a false overvoltage occurs.

28. The power supply system of claim 2, wherein said control circuit includes a voltage monitoring circuit for monitoring when said module supplies a voltage signal beyond a predetermined range to the common bus, said voltage monitoring circuit being coupled to the ORing element.

29. The power supply system of claim 28, wherein the voltage monitoring circuit includes a circuit for supplying auxiliary power, and a detector having a pair of inputs, one of said inputs being connected to receive the voltage signal and the other of said inputs being connected to said circuit for supplying auxiliary power.

30. The power supply system of claim 29, wherein said detector further includes an output signal for indicating that a predetermined voltage range has been exceeded, and said circuit for supplying auxiliary power includes,
   a source for supplying auxiliary power,
   a converter circuit coupled to said source,
   a voltage divider coupled to the converter circuit for providing the auxiliary power to the other of said inputs, said voltage divider comprising a plurality of resistors, and
   a capacitor connected to said voltage divider, wherein said capacitor and one of said resistors provide a time constant that causes said detector to generate the output signal.

31. The power supply system of claim 30, wherein said output signal changes between high and low voltage states, and the other of said resistors is arranged to cause the output signal to change to a low voltage state before the source loses regulation voltage, said low voltage state indicating a power supply failure state.

32. The power supply system of claim 1, wherein each power module further comprises a circuit for detecting if said power module's temperature exceeds a predetermined value and for causing the power module to turn off in response thereto.

33. The power supply system of claim 1, wherein said control circuit comprises at least three comparators each having an output coupled to the ORing element, wherein said comparators are arranged so that when any of said outputs generates a control signal the control signal causes said selective coupling and decoupling, and wherein each of said comparators includes a pair of inputs coupled to a respective capacitor for preventing false tripping of any of the comparators due to noise.

34. The power supply system of claim 33, wherein said corresponding module includes
   a source of AC power,
   a rectifier, and
   a converter circuit,
   wherein said rectifier comprises a first diode and second diode connected in series across the source, and said converter circuit comprises an inductor and first capacitor connected in series across the second diode and a plurality of resistors connected in series and in parallel between the converter circuit and the ORing element, said common bus being connected to a DC bus, and said ORing element comprising a MOSFET device.

35. A control circuit for detecting a plurality of conditions indicating a failure of a power module in a redundant power supply system having a plurality of such modules, said control circuit being operable to control an ORing element that selectively couples and decouples said module from a power bus, comprising:
   a first detector for detecting when a rectified voltage falls lower than an undervoltage value and for generating a first control signal in response thereto;
   a second detector for detecting when a short circuit is present in the system and for generating a second control signal in response thereto;
   a third detector for detecting one of said conditions occurring when a bus voltage exceeds an overvoltage value and for generating a third control signal in response thereto;
   an error amplifier for preventing a false undervoltage or overvoltage condition when the power module initially turns on and for generating a fourth control signal in response thereto; and
   a voltage monitoring circuit for detecting when said system supplies a voltage signal beyond a predetermined range and for generating a fifth control signal in response thereto,
   wherein each said control signal is separately coupled to the ORing element for causing decoupling of said power module from said bus in response thereto.

36. A method for controlling an ORing element disposed between a power module and a common bus, comprising:
   detecting a condition where said module fails to provide power to the common bus;
   detecting a condition where a reverse current flows across the ORing element; and
   detecting a condition occurring when voltage appearing at the common bus exceeds a predetermined range, causing said ORing element to decouple the power module from the common bus in response to the detection of any said condition.

* * * * *

UNITED STATES PATENT AND TRADEMARK OFFICE
CERTIFICATE OF CORRECTION

PATENT NO. : 6,301,133 B1 Page 1 of 1
DATED : October 9, 2001
INVENTOR(S) : Cuadra et al.

It is certified that error appears in the above-identified patent and that said Letters Patent is hereby corrected as shown below:

<u>Title page,</u>
Item [75] Inventor, Mohamed Amin S. Bernat should be -- Mohamed Amin S. Bemat --

Signed and Sealed this

Twenty-eighth Day of May, 2002

*Attest:*

JAMES E. ROGAN
*Attesting Officer*  *Director of the United States Patent and Trademark Office*